Figure 1:
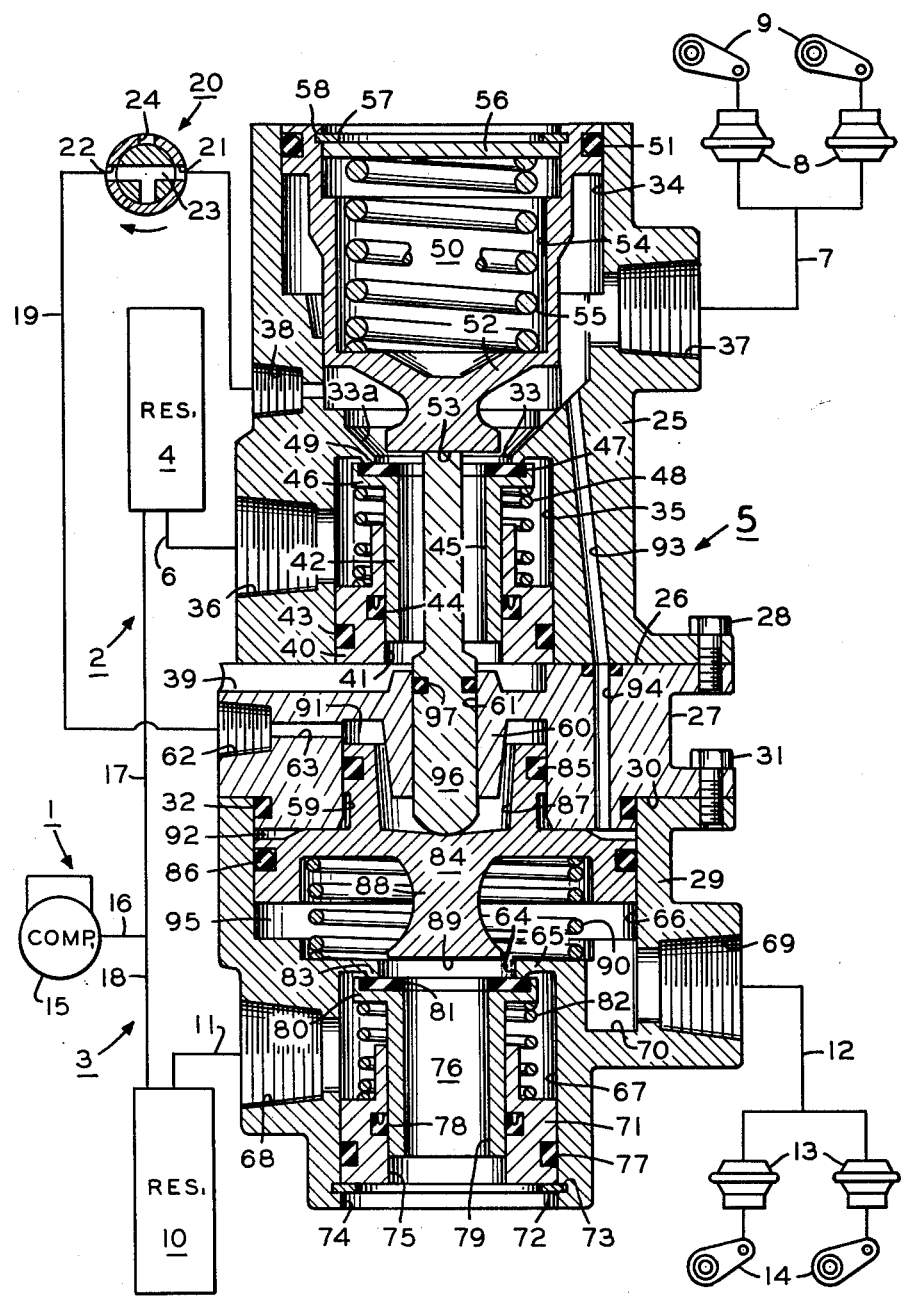

May 11, 1965   R. C. BUELER   3,183,042
RATIO SELECTOR VALVE
Filed Feb. 4, 1963

INVENTOR
RICHARD C. BUELER
BY
Joseph E. Papin.

United States Patent Office 3,183,042
Patented May 11, 1965

3,183,042
RATIO SELECTOR VALVE
Richard C. Bueler, Glendale, Mo., assignor to Wagner Electric Corporation, St. Louis, Mo., a corporation of Delaware
Filed Feb. 4, 1963, Ser. No. 256,048
16 Claims. (Cl. 303—52)

This invention relates to tandem control valves and in particular to tandem control valves of the ratio selector type.

In the past, tandem control valves were provided with separate valving therein for controlling pressure fluid flow in separate fluid pressure systems, and the valving was actuated by separate valve control or reaction means which were connected by a yoke-type linkage or the like to an operator pedal or treadle. One of the undesirable features of such past tandem control valves was that the reaction forces which provide "feel" as to the extent of the braking effort were each transmitted to the operator through the linkage from the reaction means. Another undesirable feature was that the "feel" varied upon failure of fluid pressure in one of the separate systems effecting variation in controlability which tended to confuse the operator. Another undesirable feature was that an appreciable lost stroke in the operator treadle also accompanied the failure of fluid pressure in one of the separate systems. Still another undesirable feature was that the control of the separate system could not be sequenced, i.e., one system actuated slightly before the other system to reduce the tendency of skid on slippery pavements. And still another undesirable feature was the requirement of an intermediate connecting linkage between the separate reaction means and the operator treadle.

It is an object of the present invention to provide a tandem control valve which overcomes the aforementioned undesirable and objectionable features.

Another object of the present invention is to provide a tandem control valve for controlling the flow of fluid pressure in separate fluid pressure systems wherein the fluid pressure of the flow in said separate systems will be in a predetermined ratio.

These and still other objects and advantages will become more apparent hereinafter.

Briefly, the invention embodies a tandem control valve having a pair of valve means therein which are operatively controlled by a pair of valve control means for controlling pressure fluid flow in separate systems. One of said valve control means having separate areas responsive to the establishment of fluid pressure flow in one of the separate systems to actuate one of said valve means and establish a fluid pressure flow in the other of the separate systems in a predetermined ratio therewith, and means for venting one of said areas to atmosphere wherein a fluid pressure flow is established in the other system having a ratio with that in said one system different than the predetermined ratio, the other of said valve control means being responsive to an applied force to actuate the other of said valve means to establish the pressure fluid flow in the one system.

The invention also consists in the parts and arrangements of parts hereinafter described and claimed. In the accompanying drawings which form a part of the specification and wherein like numerals refer to like parts wherever they occur:

FIG. 1 is a diagrammatic view of a fluid pressure system showing the preferred embodiment of the present invention connected therein in cross section.

Referring now to the drawing, a dual brake actuating system 1 is shown having separate fluid pressure branches indicated generally at 2 and 3. The branch 2 includes a reservoir 4 for fluid pressure storage which is connected to one of a pair of separate inlet ports of a treadle operated tandem control valve 5 by a conduit 6. The tandem control valve 5 is also provided with a pair of separate outlet ports, and a service line or conduit 7 connects one of said outlet ports with a set of brake chambers 8 which are linked with slack adjusters 9 to control the energization of an axle set of vehicle brake assemblies (not shown). The branch 3 includes a reservoir 10 for fluid pressure storage which is connected to the other of the inlet ports of the control valve 5 by a conduit 11, and another service line or conduit 12 connects the other of the outlet ports of said control valve with another set of brake chambers 13 which are linked with slack adjusters 14 to control the energization of another axle set of vehicle brake assemblies (not shown). A compressor 15 is connected with reservoirs 4 and 10 by a conduit 16 which branches at 17 and 18, said compressor and separate reservoirs forming in combination separate fluid pressure sources. To complete the system 1, another conduit 19 is connected between a pair of control or ratio ports which are provided in the control valve 5, and a two-way ratio or hand valve 20 is provided with an inlet and outlet 21 and 22 serially connected in the conduit 19. Passage means 23 in the ratio valve normally provides open pressure fluid communication between the ratio ports through the conduit 19, however, the ratio valve 20 may be rotated clockwise (in the direction of the arrow) to position the passage means 10 between the outlet 22 and an exhaust 24 thereby interrupting communication between the control ports and venting one of said control ports to atmosphere.

The tandem control valve 5 is provided with an upper housing 25 which is connected to an upper end portion 26 of an intermediate housing or separation plate 27 by suitable means, such as a plurality of studs 28. A lower housing 29 is sealably connected with a lower end portion 30 of the intermediate housing 26 by suitable means, such as studs 31, and a sealing ring 32 is sealably interposed between said intermeidate and lower housings.

The upper housing 25 is provided with a bore 33 defining an annular wall 33a axially positioned between an upper stepped counterbore 34 and a lower counterbore 35 forming a set of outlet and inlet chambers respectively. An inlet port 36 which receives the conduit 6, as previously mentioned, is provided in the upper housing 25 connecting with the counterbore 35, and an outlet port 37 which receives the service line 7, as previously mentioned, is provided in said upper housing connecting with the counterbore 34. A control or ratio port 38 which recieves the conduit 19, as previously mentioned, is also provided in the upper housing 25 connecting with the counterbore 34.

A recess 39 is provided in the upper portion 26 of the intermediate housing 27 beneath the counterbore 35 forming an exhaust chamber or port. A valve guide member 40 is received in the lower end of the counterbore 35 and is normally seated on the upper end 26 of the intermediate housing 27. The valve guide member 40 is provided with a bore 41 in which an inlet valve element 42 is slidable, and seals 43 and 44 are carried by said valve guide member in sealing engagement with the counterbore 35 and said inlet valve element, respectively. The inlet valve element 42 is provided with an exhaust bore or exhaust opening 45 and has an enlarged sealing head 46 on the upper end thereof, the sealing head including an annular resilient seal or disc 47. A valve spring 48 is provided between the valve guide 40 and the sealing head 46 and normally urges the valve seal 47 into sealing engagement with a valve seat 49 which is formed on the wall 33a at the juncture of the bore 33 and counterbore 35.

A reaction piston or valve control element 50 is slidably received in the counterbore 34, and a seal 51 is carried by said reaction piston in sealing engagement with said counterbore. The reaction piston 50 is provided with an integral extension 52 having a valve seat 53 thereon which is coaxial with the bore 33 and is normally maintained in spaced realtion with the valve seal 47 of the valve head 46. A bore 54 is provided in the reaction piston 50, and a precompressed metering spring 55 is retained therein by a retainer or treadle force receiving plate 56 which is biased into abutting engagement with a snap ring 57 positioned in a groove 58 in the upper end of the reaction piston bore 54.

The intermediate housing 27 is provided with a centrally located bore 59 having a hub portion 60 extending coaxially thereinto, and an axial bore 61 is provided through said hub portion. Another control or ratio port 62, which receives the conduit 19, as previously mentioned, is provided in the intermediate housing 27, and a passage 63 connects said other ratio port with the bore 59 adjacent to the upper end thereof.

The lower housing 29 is provided with a bore 64 defining an annular wall 65 axially positioned between counterbores 66 and 67, the counterbore 67 forming an inlet chamber. Another inlet port 68 which receives the conduit 11, as previously mentioned, is provided in the lower housing 29 connecting with the counterbore 67, and another outlet or working port 69 which receives the service line 12, as previously mentioned, is connected with the counterbore 66 by a passage 70. Another valve guide member 71 is positioned against displacement in the counterbore 67 by a snap ring 72 received in a groove 73 adjacent the lower end of said counterbore, and the lower end of said counterbore forms an exhaust port 74. The valve guide 71 is provided with a bore 75 in which another inlet valve element 76 is slidable, and seals 77 and 78 are carried by said valve guide in sealing engagement with the counterbore 67 and said inlet valve element, respectively. The inlet valve element 76 is provided with an axial bore or exhaust opening 79 and has an enlarged sealing head 80 on the upper end thereof, the sealing head including an annular resilient seal or disc 81. A valve spring 82 is provided between the valve guide 70 and the sealing head 80 and normally urges the valve seal 81 into sealing engagement with a valve seat 83 which is formed on the wall 65 at the juncture of the bore 64 and counterbore 67.

A stepped relay piston or valve cotrol element 84 is slidably received in the intermediate housing bore 59 and the lower housing counterbore 66, and seals 85 and 86 are carried by said relay piston in sealing engagement with said bore and counterbore, respectively. A recess 87 is axially provided in the upper portion of the relay piston 84, and an axial extension 88 is integrally provided on the lower portion of said relay piston having a valve seat 89 which is coaxial with the bore 64 and is normally maintained in predetermined spaced relation with the valve seal 81 by a return spring 90 urging said relay piston toward its normally released or inoperative position, as shown. An expansible ratio or control chamber 91 is formed in the intermediate housing bore 59 by the smaller portion of the stepped relay piston 84 in open communication with the ratio port and passage 62 and 63. An expansible application chamber 92 is formed in the counterbore 66 between the lower portion 30 of the intermediate housing 27 and the larger portion of the stepped relay piston 84, and said application chamber is connected in open pressure fluid communication with the counterbore 34 in the upper housing 25 by aligned passageways 93 and 94 provided in the upper and intermediate housings 25 and 27, respectively. An outlet or working chamber 95 is also provided in the counterbore 66 between the relay piston 84 and the housing wall 65, and said outlet chamber is in open pressure fluid communication with the outlet passage and port 70 and 69.

To complete the tandem control valve 5, a driving linkage or lost motion connection 96 is slidably received in the hub portion bore 61 of the intermediate housing 27, and a seal 97 carried by said connection is sealably engaged with said bore. The upper and lower ends of the connection 96 are normally engaged with the reaction and relay pistons 50 and 84, respecitvely, for applied force transmission purposes in the event of failure of the fluid pressure sources of branches 2 and 3, as will be fully explained hereinafter. It should be noted that the force of the return spring 90 is transmitted through the relay piston 84 and the connection 96 to the reaction piston 50 thus positioning said reaction piston in its normal released or inoperative position, as shown.

In the operation with the passage means 23 connecting the ratio ports 38 and 62 in pressure fluid communication through the conduit 19, as described, a manually applied force by the operator on the force receiving plate 56 of the reaction piston 50 moves the valve seat 53 downwardly into sealing engagement with the valve seal 47 closing the exhaust passage 45 and isolating the outlet chamber 34 from the atmosphere. Further downward movement of the reaction piston 50 disengages the inlet valve 42 from the seat 49 on the wall 33a to establish pressure fluid communication between the inlet and outlet ports 36 and 37. The pressure fluid flows from the reservoir 4 through the conduit 6, the inlet port 36, the inlet chamber 35 and the bore 33 into the outlet chamber 34 and outlet port 37 and therefrom through the service line 7 to actuate brake chambers 8 and rotate slack adjusters 9 to energize the axle set of wheel brake assemblies associated therewith. At the same time, the pressure fluid flows from the outlet chamber 34 through the ratio port 38, the conduit 19 and ratio valve 20, the ratio port 62 and passage 63 into the ratio chamber 91, and said pressure fluid also flows from said outlet chamber through the passages 93 and 94 into the application chamber 92. The fluid pressure so established in the ratio and application chambers 91 and 92 acts on the effective areas of the relay piston 84 therein creating an application force to move said relay piston downwardly against the negligible force of the return spring 90 to engage the valve seat 89 with the valve seal 81 closing the exhaust passage 79 and isolating the outlet chamber 95 from the atmosphere. Further downward movement of the relay piston 84 disengages the inlet valve 76 from the seat 83 on the wall 65 to establish pressure fluid communication between the inlet and outlet ports 68 and 69. The pressure fluid flows from the reservoir 10 through the conduit 11, the inlet port 68, the inlet chamber 67, the bore 64, the outlet chamber 95, and the outlet port and passage 69 and 70 into the service line 12 and therefrom into brake chambers 13 to rotate slack adjusters 14 and energize the axle set of wheel brake assemblies associated therewith. It should be noted that the reaction piston 50 opens the inlet valve 42 before the relay piston opens the inlet valve 76.

When the reaction force created by the established fluid pressure in the outlet chamber 34 acting on the effective area of the reaction piston 50 equals the manually applied force, said reaction piston is moved upwardly against the metering spring 55 wherein the inlet valve 42 is positioned in lapped engagement with the valve seat 49 and the reaction piston valve seat 53 is positioned in lapped engagement with said inlet valve. The reaction force acting through the metering spring against the manually applied force on the plate 56 affords the operator a direct and accurate "feel" as to the extent of the braking effort or application. Similarly, when the reaction force created by the established fluid pressure in the outlet chamber 95 acting on the effective area of the relay piston 84 equals the application force on said relay piston, said relay piston is moved upwardly wherein the inlet valve 76 is positioned in lapped engagement with the valve seat 83 and the relay piston valve seat 89 is positioned in lapped engagement with said inlet valve. If greater braking effort is desired, the manually applied force is increased which results in an increased application force, and the component parts of the control valve 5 function in the same manner as previously described to again move said component parts to their lapped positions.

When the desired braking effort is attained, the manually applied force is removed from the reaction piston 50, and the fluid pressure in the outlet chamber 34 moves said reaction piston upward to its original or inoperative position; therefore, the valve return spring 48 also moves the inlet valve 42 upwardly to its original position. Initially, this upward movement sealably re-engages the inlet valve seal 47 with the seat 49 to again interrupt pressure fluid communication between the inlet and outlet ports 36 and 37, and further upward movement of the reaction piston 50 disengages its seat 53 from the inlet valve seal 47 to re-establish communication between the outlet port 37 and the atmosphere and de-energize the wheel brake assemblies associated therewith by exhausting pressure fluid from the brake chambers 8 through the service line 7, said outlet port, the outlet chamber 34, the inlet valve exhaust passage 41 and the exhaust chamber and port 39 of the intermediate housing 27. At the same time fluid pressure is also exhausted from the ratio chamber 91 through the ratio port 62, the conduit 19, the hand valve 20 and the ratio port 38 into the outlet chamber 34 and therefrom to atmosphere, and pressure fluid is also simultaneously exhausted from the application chamber 92 through the passageways 93 and 94 into the outlet chamber 34 and therefrom to atmosphere. In this manner, the application force on the relay piston 84 is eliminated, and the forces of the return springs 82 and 90 move the inlet valve 76 and said relay piston upwardly to their original or inoperative positions. Initially this upward movement sealably re-engages the valve seal 81 with the seat 83 on the wall 65 to interrupt pressure fluid communication between the inlet and outlet ports 68 and 69 and further upward movement of the relay piston 84 disengages its seat 89 from the valve seal 81 to open the inlet valve exhaust passage 79 and re-establish communication between the outlet port 31 and the atmosphere to de-energize the wheel brake assemblies associated therewith by exhausting fluid pressure from the brake chambers 13 through the service line 12, the outlet port and passage 69 and 70, the outlet chamber 95 and the inlet valve exhaust passage 79 to the exhaust port 74.

Since the additive effective input areas of the relay piston 84 in the ratio and application chambers 91 and 92 are substantially equal to and opposite the effective reaction area of said relay piston in the outlet chamber 95, it is apparent that the above described braking application resulted in a substantially 1:1 ratio between the fluid pressure of the established flow in the branches 2 and 3. In other words, the fluid pressure of the flow established in branch 2 and applied to the ratio and application chambers 91 and 92 acted on the relay piston 84 to establish flow in the branch 3 having a fluid pressure substantially equal to that of the branch 2 and acting in the outlet chamber 95 on the relay piston 84. If the operator desires to reduce the fluid pressure of the flow established in the branch 3 so that the ratio between branches 2 and 3 is less than 1:1; the hand valve 20 is rotated clockwise (in the direction of the arrow) to a position aligning the passage 23 between the outlet and exhaust 22 and 24. In this manner, pressure fluid communication between the ratio ports 38 and 62 is interrupted and the ratio chamber 91 is vented to atmosphere through the ratio port 62, the conduit 19 and the outlet, passage means and exhaust 22, 23, and 24, respectively, of the hand valve 20. A manual force applied to the reaction piston 50 by the operator actuates the inlet valve 42, as previously described, to establish fluid pressure flow in the branch 2 creating a fluid pressure in the outlet chamber 34 to actuate the brake chambers 8. Since the hand valve 20 is positioned to obviate flow through the ratio port 38 and to exhaust the ratio chamber 91, the established flow is passed only through the passageways 93 and 94 into the application chamber 92. The fluid pressure so established in the application chamber 92 acts on the effective area of the relay piston 84 therein creating an application force to move relay piston downwardly to actuate the inlet valve 76, as previously described, and establish fluid pressure flow in the branch 3; however, since the effective area of the relay piston 84 in the outlet chamber 95 is greater than that in the application chamber 92, a proportionally smaller fluid pressure is established in said outlet chamber to act on the greater effective area of said relay piston therein creating a reaction force in opposition to the application force and actuating the brake chambers 13. Since the smaller fluid pressure of the flow in branch 3 acting on the larger effective area of the relay piston 84 in the outlet chamber 92 is opposed by the larger fluid pressure of the flow in the branch 2 acting on the smaller effective area of said relay piston in the application chamber 92, it is apparent that these forces are self-cancelling and that the operator feels only the reaction force of the fluid pressure in the branch 2 acting on the reaction piston 50 in the outlet chamber 34.

In the event of the failure of the branch 2 with a resultant loss of fluid pressure in the reservoir 4, the manually applied force on the reaction piston 50 is transmitted directly to the relay piston 84 through the connecting linkage 96 to effect the direct actuation of the inlet valve 76. In this manner, the reaction piston 50 is moved downwardly in response to the applied force thereon to actuate the inlet valve 42; however, since the branch 2 is assumed to have failed, the establishment of fluid pressure therein is obviated. Of course, the applied force is directed to the relay piston 84 through the linkage 96; therefore, further downward movement of the reaction and relay pistons 50 and 84 effects actuation of the inlet valve 76 to establish fluid pressure flow in the branch 3, as previously described. The fluid pressure established in the outlet chamber 95 acts on the effective area of the relay piston 84 to create a reaction force in opposition to the applied force thereby affording the operator a direct and accurate "feel" as to the extent of the braking effort. It should be noted that lost stroke is maintained at a minimum upon failure of the branch 2. In other words, the lost stroke represents only the movement of the reaction piston 50 after the inlet valve 42 is unseated and until the relay piston 84 unseats the inlet valve 76.

In the event of the failure of the branch 3 with a resultant loss of the fluid pressure in the reservoir 10, the applied force on the reaction piston 50 actuates the inlet valve 42 to establish fluid pressure flow in the branch 2, as previously described. In this manner, pressure fluid is established in the outlet chamber 34 and brake chambers 8, and the fluid pressure also passes through the housing passages 93, 94 into the application chamber 92. If the hand valve 20 is positioned to pass fluid pressure from the outlet chamber 34 to the ratio chamber 91, then fluid pressure is also simultaneously established in said ratio chamber. The fluid pressure in the ratio and application chambers 91 and 92 serves to move the relay piston 84 to actuate the inlet valve 76; however, since it is assumed that the branch 3 has failed, the establishment of flow therein is, of course, obviated. Nevertheless, the fluid pressure in the outlet chamber 34 acts on the reaction piston 50 creating a reaction force in opposition to the applied force and affording the operator a direct and accurate "feel" of the braking effort or application. Of course, lost stroke is obviated upon failure of the branch 3 since the operator feels the reaction force as soon as the inlet valve 42 is unseated.

It is now apparent that a novel ratio selector valve or control valve meeting the objects set out hereinbefore is provided and that changes or modifications to the precise configurations, shapes or details of the constructions set forth in the disclosure by way of illustration may be made

What I claim is:

1. A control valve for use in a dual brake system comprising a housing, a pair of application means movable in said housing, means within said housing including said application means defining a pair of pressure fluid flow passages adapted for respective connection between the fluid pressure sources and the fluid pressure responsive motors of said dual brake system, one of said application means being movable in response to an applied force to effect the application of fluid pressure through one of said flow passages, the other of said application means also defining with said housing a pair of expansible fluid pressure chambers in opposed relation with the other of said flow passages, passage means connecting one of said chambers in pressure fluid communication with the applied fluid pressure in said one flow passage, said other application means being movable in response to fluid pressure in said one chamber to effect the application of fluid pressure through the other of said flow passages in a predetermined ratio with that applied in said one flow passage, and other means for selectively connecting the other of said chambers in pressure fluid communication with the fluid pressure applied in said one flow passage, said other application means being responsive to the fluid pressure in said chambers upon the connection of said other chamber with the fluid pressure applied in said one flow passage to effect the application of fluid pressure through said other flow passage in a ratio proportionally changed from the predetermined ratio.

2. The control valve according to claim 1 comprising force transmitting means engaged between said application means, said force transmitting means serving to transmit the applied force on said one application means to move said other application means and effect the application of fluid pressure through said other flow passage in the event of fluid pressure failure of the source connected with said one flow passage.

3. A control valve for use in a dual brake system comprising a housing, a pair of valve control members movable in said housing, means within said housing including said valve control members defining a pair of pressure fluid flow passages for respective connection between the fluid pressure sources and the fluid pressure responsive motors of said dual brake system, a pair of valve means controlling said flow passages, one of said valve control members being movable in response to an applied force to engage and move one of said valve means to an open position in one of said flow passages establishing pressure fluid flow therethrough, the other of said valve control members also defining with said housing a pair of expansible fluid pressure chambers in opposed relation with the other of said flow passages, passage means connecting one of said chambers in pressure fluid communication with the established fluid pressure in said one flow passage, said other valve control member being movable in response to fluid pressure in said one chamber to engage and move the other of said valve means to an open position in the other of said flow passages establishing pressure fluid flow therethrough in a predetermined ratio with the established fluid pressure in said one flow passage, and other means for selectively connecting the other of said chambers in pressure fluid communication with the established fluid pressure in said one flow passage, said other valve control member being responsive to fluid pressure in said chambers upon the connection of said other chamber with the established fluid pressure in said one flow passage to actuate said other valve means and establish fluid pressure in said other flow passage in a ratio different than the predetermined ratio.

4. The control valve according to claim 3 comprising a pair of exhaust openings in said valve means normally venting the portions of said flow passages connected with the fluid pressure responsive motors to atmosphere and being closed upon the engagement of said valve control members and valve means, respectively.

5. The control valve according to claim 3 comprising an exhaust opening in said one valve means normally venting the portion of said one flow passage connected with the fluid pressure responsive motor to the atmosphere and being closed upon the engagement of said one valve control member and said one valve means, and force transmitting means extending through said exhaust opening between said valve control members, said force transmitting means serving to transmit the applied force to said other valve control member to effect actuation thereof in the event of failure of the fluid pressure source connected with said one flow passage.

6. A control valve for use in a dual brake system comprising a housing, a pair of valve control members movable in said housing, means within said housing including said valve control members defining a pair of pressure fluid flow passages for respective connection between the fluid pressure sources and fluid pressure responsive motors of said dual braking system, a pair of valve means normally urged to a closed position in said flow passages interrupting pressure fluid flow therethrough, respectively, one of said valve control members being movable in response to an applied force to engage and move one of said valve means to an open position in one of said flow passages establishing pressure fluid flow therethrough, the other of said valve control members also defining with said housing a pair of expansible fluid pressure chambers in opposed relation with the other of said flow passages, passage means in said housing connecting one of said chambers in open pressure fluid communication with the established fluid pressure in said one flow passage, said other valve control member being movable in response to fluid pressure in said one chamber to engage and move the other of said valve means to an open position in the other of said flow passages establishing pressure fluid flow therethrough in a predetermined ratio with the established fluid pressure in said one flow passage, and other means connected between the other of said chambers and said one flow passage including selectively operable means movable between one position for connecting said other chamber with the atmosphere to provide the predetermined ratio between the established fluid pressures in said flow passages and another position for connecting said other chamber in open pressure fluid communication with the established fluid pressure in said one flow passage, said other valve control member being responsive to fluid pressure in said one and other chambers when said selectively operable means is in the other position thereof to actuate said other valve means and establish fluid pressure in said other flow passage in a ratio proportionally changed from the predetermined ratio.

7. A control valve for use in a dual braking system comprising a housing, first application means in said housing and movable in response to an applied force thereon to effect the application of fluid pressure between one fluid pressure source and fluid pressure responsive motor of said dual braking system, second application means movable in said housing including a pair of separate input areas and an opposing reaction area, means within said housing for subjecting one of said input areas to the fluid pressure applied by said first application means, said second application means being movable in response to fluid pressure acting on said one input area to effect the application of fluid pressure between the other fluid pressure source and fluid pressure responsive motor of said dual braking system, said reaction area being responsive to the fluid pressure applied by said second application means to oppose further movement thereof and establish a predetermined ratio between the fluid pressure applied by said first and second application means, and means for selectively subjecting the other of said input areas to the fluid pressure applied by said first application means, said second application means being further movable in response to fluid pressure acting on said one and other input areas when said other input area is subjected to the fluid pressure applied by said first application means to change the ratio between the fluid pressure applied thereby and that applied by said first application means.

8. The control valve according to claim 7 wherein said reaction area is substantially equal to said input areas to provide substantially equal magnitudes between the fluid pressures applied by said first and second application means when said other input area is subjected to the fluid pressure applied by said first application means.

9. A control valve comprising a housing having a pair of sets of ports therein, each port set including inlet and outlet ports, a pair of valve means controlling pressure fluid communication between the ports of said port sets, respectively, a pair of valve control members movable in said housing for operative engagement with said valve means, one of said valve control members being movable in response to an applied force to engage and move one of said valve means to a position establishing pressure fluid communication between the inlet and outlet ports of one of said port sets, the other of said valve control members defining with said housing a pair of expansible fluid pressure chambers and an opposing reaction chamber, one of said expansible chambers being connected in pressure fluid communication with the outlet port of said one port set and said reaction chamber being connected in pressure fluid communication with the outlet port of the other of said port sets, said other valve control member being movable in response to fluid pressure in said one expansible chamber to engage and move the other of said valve means to a position establishing pressure fluid communication between the inlet and outlet ports of said other port set, the established fluid pressures at the outlet ports of said port sets being in a predetermined ratio, and means for selectively connecting the other of said expansible chambers in pressure fluid communication with the outlet port of said one port set, said other valve control member being responsive to fluid pressure in said expansible chambers upon the connection of said other expansible chamber in pressure fluid communication with the outlet port of said one port set to actuate said other valve means and establish another fluid pressure at the outlet port of said other port set having a ratio with that established at the outlet port of said one port set different than the predetermined ratio.

10. The control valve according to claim 9 comprising force transmitting means engaged between said valve control members, said force transmitting means serving to transmit the applied force from said one valve control member to said other valve control member to effect actuation of said other valve means in the event that actuation of said one valve means fails to establish fluid pressure at the outlet port of said one port set.

11. The control valve according to claim 9 comprising a pair of exhaust openings in said valve means normally venting the outlet ports of said port sets to the atmosphere, said exhaust openings being closed upon the engagement of said valve control members and valve means, respectively.

12. The control valve according to claim 9 comprising an exhaust opening in said one valve means normally venting the outlet port of said one port set to the atmosphere, said exhaust opening being closed upon the engagement of said one valve control member and said one valve means, and means connected between said valve control members to transmit the applied force to said other valve control member and effect actuation of said other valve means in the event that actuation of said one valve means fails to establish fluid pressure at the outlet port of said one port set.

13. The control valve according to claim 9 comprising a pair of input areas on said other valve control member respectively reponsive to fluid pressure in said expansible chambers, a reaction area on said other valve control member responsive to fluid pressure in said reaction chamber and substantially equal to said input areas, the magnitudes of the established fluid pressures respectively acting on said input and reactive areas being substantially equal when said last named means connects said other expansible chamber in pressure fluid communication with the outlet port of said one port set.

14. A control valve comprising a housing having a pair of sets of ports therein, each port set including inlet, outlet and exhaust ports, a pair of valve means normally establishing pressure fluid communication between the outlet and exhaust ports of said port sets and interrupting pressure fluid communication between the inlet and outlet ports of said port sets, respectively, a pair of valve control members movable in said housing for operative engagement with said valve means, one of said valve control members being movable in response to an applied force to engage one of said valve means interrupting pressure fluid communication between the outlet and exhaust ports of one of said port sets and thereafter move said one valve means to a position establishing pressure fluid communication between the inlet and outlet ports of said one port set, the other of said valve control members defining with said housing a pair of expansible fluid pressure chambers and an opposing reaction chamber, said reaction chamber being in pressure fluid communication with the outlet port of the other of said port sets, passage means connecting one of said expansible chambers in pressure fluid communication with the outlet port of said one port set, said other valve control member being movable in response to fluid pressure in said one expansible chamber to engage the other of said valve means interrupting pressure fluid communication between the outlet and exhaust ports of said other port set and thereafter move said other valve means to a position establishing pressure fluid communication between the inlet and outlet ports of said other port set, the established fluid pressure at the outlet port of said other port set acting on said other valve control member in said reaction chamber to oppose further movement thereof and being in a predetermined ratio with that established at the outlet port of said one port set, and means connected between the other of said expansible chambers and the outlet port of said one port set including selectively operable means movable between one position for connecting said other expansible chamber with the atmosphere to provide the predetermined ratio between the established fluid pressures at the outlet ports of said port sets and another position for connecting said other expansible chamber in pressure fluid communication with the outlet port of said one port set, said other valve control member being responsive to fluid pressure in said one and other expansible chambers when said selectively operable means is in the other position thereof to actuate said other valve means and establish another fluid pressure at the outlet port of said other port set having a ratio with that established at the outlet port of said one port set different than the predetermined ratio.

15. A control valve comprising a housing having a pair of sets of chambers therein, each chamber set including inlet and outlet chambers, a pair of connecting passages between the inlet and outlet chambers of said chamber sets, respectively, a pair of valve seats on said housing in circumscribing relation with said connecting passages, a pair of valve means in the inlet chambers of said chamber sets and normally urged into engagement with said valve seats closing said connecting passages to interrupt pressure fluid communication between the inlet chambers of said chamber sets, a pair of valve control members movable in the outlet chambers of said chamber sets and each including extension means movable through said connecting passage for operative engagement with said valve means, one of said valve control members being movable in response to an applied force to initially engage the extension means thereof with one of said valve means and subsequently disengage said one valve means from one of said valve seats to open one of said connecting passages and establish pressure fluid communication between the inlet and outlet chambers of one of said chamber sets, the other of said valve control members defining with said housing a pair of fluid pressure expansible chambers in opposition to the outlet chamber of the other of said chamber sets, passage means in said housing providing the passage of the fluid pressure established in the outlet chamber of said one chamber set into one of said expansible chambers, said other valve control member being movable in response to fluid pressure in said one expansible chamber to initially engage the extension means thereof with the other of said valve means and subsequently disengage said other valve means from the other of said valve seats to open the other of said connecting passages and establish pressure fluid communication between the inlet and outlet chambers of said other chamber set, the established fluid pressure in the outlet chamber of said other chamber set acting on said one valve control member to oppose further movement thereof and being in a predetermined ratio with that established in the outlet chamber of said one chamber set, and means for selectively connecting the other of said expansible chambers in pressure fluid communication with the outlet chamber of said one chamber set, said other valve control member being movable in response to fluid pressure in said one and other expansible chambers upon the connection of said other expansible chamber in pressure fluid communication with the outlet chamber of said one chamber set to actuate said valve means and establish fluid pressure in the outlet chamber of said other chamber set in a ratio with that established in the outlet chamber of said one chamber set different than the predetermined ratio.

16. A control valve comprising a housing having first inlet and outlet chambers and second inlet and outlet chambers therein, first and second valve seats on said housing and facing said first and second inlet chambers, first and second connecting passages extending through said first and second valve seats and interconnecting said first and second inlet and outlet chambers, respectively, first and second inlet valve elements normally urged into sealing engagement with said first and second valve seats to interrupt pressure fluid communication between said first and second inlet and outlet chambers, respectively first and second exhaust openings in said first and second inlet valve elements normally communicating said first and second outlet chambers with the atmosphere, reaction piston means slidable in said first outlet chamber and having a first extension thereon for movement through said first connecting passage, a third valve seat on said first extension for operative engagement with said first inlet valve element, said reaction piston means and first extension being initially movable in response to an applied force thereon to move said third valve seat into sealing engagement with said first inlet valve element to close said first exhaust opening and interrupt communication between said first outlet chamber and the atmosphere and being further movable to disengage said first inlet valve element from said first valve seat to open said first connecting passage and establish pressure fluid communication between said first inlet and outlet chambers, first and second application chambers in said housing, other piston means slidable in said housing and forming a movable wall between said first and second application chambers and said second outlet chamber, a second extension on said other piston means for movement through said second connecting passage, a fourth valve seat on said second extension for operative engagement with said second valve means, first passage means connecting said first application chamber in open pressure fluid communication with said first outlet chamber, second passage means including movable operator controlled means for connecting said second application chamber in open pressure fluid communication with said first outlet chamber, said operator controlled means being adapted for movement to a position closing communications between said second application chamber and first outlet chamber and venting said second application in chamber to atmosphere, first and second application areas on one side of said other piston means responsive to fluid pressure in said first and second application chambers, respectively, a reaction area on the other side of said other piston means substantially equal to said first and second application areas and responsive to fluid pressure in said second outlet chamber, said other piston means and second extension being initially movable in response to fluid pressure in said first and second application chambers acting on said first and second application areas to move said fourth valve seat into sealing engagement with said second inlet valve element to close said second exhaust opening and interrupt communication between said second outlet chamber and the atmosphere and being further movable to disengage said second valve element from said second valve seat to open said second connecting passage and establish pressure fluid communication between said second inlet and outlet chambers, the established fluid pressure in said second outlet chamber acting on said reaction area to oppose further movement of said other piston means and being substantially equal to that established in said second outlet chamber and acting on said first and second application areas, and said other piston means being further movable to actuate said second inlet valve element and proportionally reduce the fluid pressure in said second outlet chamber upon movement of said operator controlled means to the piston closing communication between said second application chamber and said first outlet chamber and venting said second application chamber to the atmosphere.

References Cited by the Examiner
UNITED STATES PATENTS

| | | | |
|---|---|---|---|
| 2,406,284 | 8/46 | Fitch | 137—102 |
| 3,138,410 | 6/64 | Bueler | 303—52 |

FOREIGN PATENTS

| | | |
|---|---|---|
| 798,816 | 7/58 | Great Britain. |

FERGUS S. MIDDLETON, *Primary Examiner.*

UNITED STATES PATENT OFFICE
CERTIFICATE OF CORRECTION

Patent No. 3,183,042                                                  May 11, 1965

Richard C. Bueler

It is hereby certified that error appears in the above numbered patent requiring correction and that the said Letters Patent should read as corrected below.

Column 8, line 72, for "pressure" read -- pressures --; column 10, line 70, after "let" insert -- and outlet --; column 12, line 21, strike out "in"; line 48 for "piston" read -- position --; line 49, strike out "said", second occurrence.

Signed and sealed this 12th day of April 1966.

(SEAL)
Attest:

ERNEST W. SWIDER                                         EDWARD J. BRENNER
Attesting Officer                                              Commissioner of Patents